(12) United States Patent
Estevez et al.

(10) Patent No.: US 7,123,772 B2
(45) Date of Patent: Oct. 17, 2006

(54) IMAGE COMPRESSION BY DIFFERENCES WITHIN A STRIP

(75) Inventors: Leonardo Estevez, Rowlett, TX (US); Karen Oehler, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 668 days.

(21) Appl. No.: 10/025,531

(22) Filed: Dec. 19, 2001

(65) Prior Publication Data

US 2002/0141653 A1 Oct. 3, 2002

Related U.S. Application Data

(60) Provisional application No. 60/279,469, filed on Mar. 28, 2001.

(51) Int. Cl.
*G06K 9/36* (2006.01)
*G06K 9/68* (2006.01)

(52) U.S. Cl. ................................... 382/236

(58) Field of Classification Search ............... 382/172, 382/218, 232, 233, 235, 236, 239, 250; 375/240.05, 375/240.07, 240.13, 240.2; 348/231.2, 372; 709/247, 253; 386/46
See application file for complete search history.

(56) References Cited

U.S. PATENT DOCUMENTS

| | | | | |
|---|---|---|---|---|
| 5,412,425 A * | 5/1995 | Nagano | ...................... | 348/372 |
| 5,528,293 A * | 6/1996 | Watanabe | ................ | 348/231.2 |
| 5,828,848 A * | 10/1998 | MacCormack et al. | ..... | 709/247 |
| 6,006,276 A * | 12/1999 | MacCormack et al. | ..... | 709/253 |
| 6,359,928 B1 * | 3/2002 | Wang et al. | ............ | 375/240.05 |
| 6,434,273 B1 * | 8/2002 | Gillman et al. | ............. | 382/239 |
| 6,449,392 B1 * | 9/2002 | Divakaran et al. | .......... | 382/235 |
| 6,724,817 B1 * | 4/2004 | Simpson et al. | ........ | 375/240.07 |
| 6,724,939 B1 * | 4/2004 | Mekuria | ..................... | 382/233 |
| 6,766,098 B1 * | 7/2004 | McGee et al. | ................ | 386/46 |

* cited by examiner

*Primary Examiner*—Amir Alavi

(74) *Attorney, Agent, or Firm*—Carlton H. Hoel; W. James Brady; Frederick J. Telecky, Jr.

(57) ABSTRACT

A method of image/video compression by analysis of variability of block DCT coefficients in a strip of (macro)blocks to decide on treatment of the blocks in the strip as either encoding each block or approximation of all blocks in the strip by the corresponding strip of (macro)blocks of a prior image.

3 Claims, 2 Drawing Sheets

IMAGE COMPRESSION BY DIFFERENCES WITHIN A STRIP

CROSS REFERENCE TO RELATED APPLICATIONS

This application claims priority from provisional application Appl. No. 60/279,469, filed Mar. 28, 2001.

BACKGROUND OF THE INVENTION

This invention relates to integrated circuits, and more particularly, to integrated circuits and image and video compression methods.

Recently, Digital Still Cameras (DSCs) have become a very popular consumer appliance appealing to a wide variety of users ranging from photo hobbyists, web developers, real estate agents, insurance adjusters, photo-journalists to everyday photography enthusiasts. Recent advances in large resolution CCD arrays coupled with the availability of low-power digital signal processors (DSPs) has led to the development of DSCs that come quite close to the resolution and quality offered by traditional film cameras. These DSCs offer several additional advantages compared to traditional film cameras in terms of data storage, manipulation, and transmission. The digital representation of captured imges enables the user to easily incorporate the images into any type of electronic media and transmit them over any type of network. The ability to instantly view and selectively store captured images provides the flexibility to minimize film waste and instantly determine if the image needs to be captured again. With its digital representation the image can be corrected, altered, or modified after its capture. See for example, Venkataraman et al, "Next Generation Digital Camera Integration and Software Development Issues" in Digital Solid State Cameras: Design and Applications, 3302 Proc. SPIE (1998). Similarly, U.S. Pat. No. 5,528,293 and U.S. Pat. No. 5,412,425 disclose aspects of digital still camera systems including storage of images on memory cards and power conservation for battery-powered cameras.

Further, DSCs can be extended to capture video clips (short video sequences) and to compress images/video with methods such as JPEG for (sequences of) still images and MPEG for video sequences. In DCT-based video compression such as H.261, H.263, MPEG1, MPEG2, and MPEG4, or image compression such as JPEG, a picture is decomposed into macroblocks. Each macroblock contains a certain number of 8×8 blocks, depending upon the chroma-format used. For example, in the case of 4:2:0 chroma-format a macroblock is made up of four 8×8 luminance blocks and two 8×8 chrominance blocks. FIG. 3 depicts in block diagram a DCT-based video or image sequence encoding camera system. In order to reduce the bit-rate, 8×8 DCT (discrete cosine transform) is used to convert the blocks into the frequency domain for quantization. The first coefficient in an 8×8 DCT block is called the DC coefficient; the remaining 63 DCT-coefficients in the block are called AC coefficients. The DCT-coefficient blocks are quantized, scanned into a 1-D sequence, and coded by using variable length coding (VLC). For predictive coding in which motion compensation (MC) is involved, inverse-quantization and IDCT are needed for the feedback loop.

In some cases, however, processors may have limited processing power, which could make real-time video or still-image sequence encoding impossible. Similarly, other digital cameras, such as cameras in a network, may have limited processing power which impairs video encoding.

SUMMARY OF THE INVENTION

The invention provides a video and/or image compression based on strips of (macro)blocks and includes decisions to encode a strip or approximate it by an already-encoded corresponding strip of a prior frame and/or image.

This has advantages including reduction in encoding complexity and/or reduction in memory requirements without significant video and/or image coding quality degradation.

BRIEF DESCRIPTION OF THE DRAWINGS

The drawings are heuristic for clarity.

DESCRIPTION OF THE PREFERRED EMBODIMENTS

1. Overview

The preferred embodiment video compression/decompression methods efficiently encode sequences of JPEG images. The methods use the correlation between successive frames to create a space efficient intermediate format consisting of a bitmap and bitstream segments. Because JPEG encodes images as rows of 8×8 (or 16×16) blocks, the image is divided into image region strips consisting of successive rows of blocks, a single row of blocks, or part of a row of blocks. Each strip is represented either by (1) the usual JPEG bitstream segment or (2) an approximation by the corresponding bitstream segment from a previous image. The method's bitmap includes a value for each strip that indicates which of these two representations is used. When the image is retrieved, the bitmap is used to coordinate interleaving the appropriate bitstream segments.

The methods may bit pad and insert a JPEG restart marker at the end of each strip bitstream segment. This provides byte alignment for the bitstream segment which makes segment storage, retrieval, and interleaving much more efficient.

2. DC Coefficient Preferred Embodiments

Figure 1:
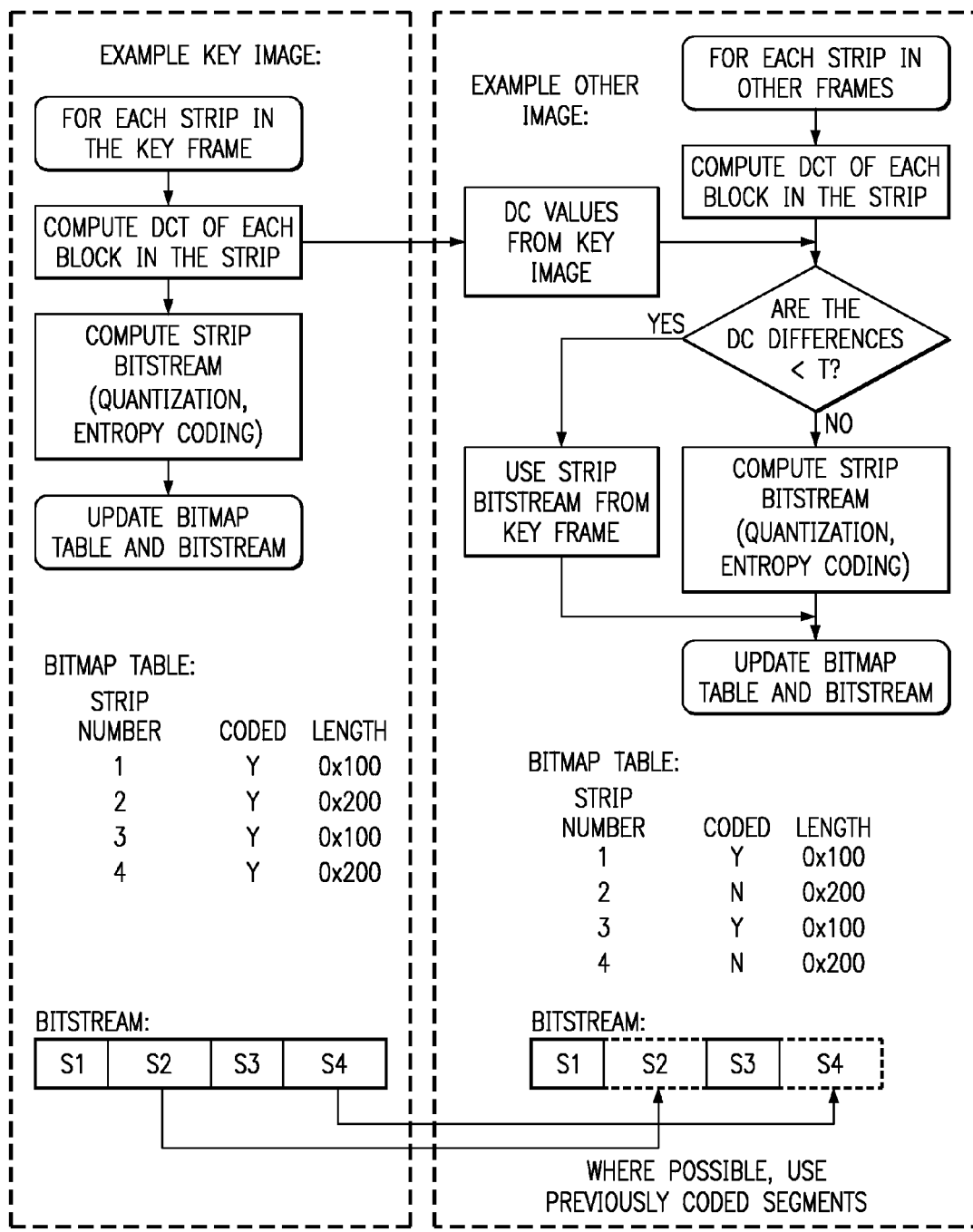
FIG. 1 illustrates preferred embodiment compression.

FIG. 1 illustrates a first preferred embodiment encoding and decoding for a sequence of frames (images). Selecting which strips of an image to encode and which to approximate with a previous image strip impacts both the resulting image quality and the encoding complexity. The first preferred embodiment method uses DC coefficient differencing between two consecutive images to determine whether or not to store information for that strip. The definition of the strips could be simple, such as a fixed number of (macro) blocks, or customized to suit the capabilities of a particular realization. Indeed, during compression, image data is typically buffered, i.e., groups of blocks are transferred successively to an internal memory buffer with burst memory transfers (e.g., direct memory access, DMA). It is useful to select the strip size to be no greater than this buffer size so that the associated strip processing can be accomplished within a single memory transfer.

The preferred embodiment encoder works as follows: Every few (e.g. 5–20) frames, a complete JPEG image is encoded (the key frame). The DCT coefficients of the blocks corresponding to each strip of the key frame are maintained in memory. The next frame's DCT coefficients (or only the DC coefficient) for blocks of each strip are then computed.

The DC coefficient of each block of the strip is then differenced with that of the corresponding block of the strip of the key frame and (absolute value) compared to a threshold. The decision to encode the strip is made if the sum of the DC coefficient differences over the blocks in the strip or the maximum DC coefficient difference over the blocks of the strip is below the threshold. A bit mask with one bit corresponding to each strip is then stored with each subsequent image (until the next key frame)—where a 1 indicates the strip is encoded and a 0 indicates the strip is not encoded. The rest of the compressed image then contains the bitstream segments from the strips which need to be compressed.

When a particular image is recalled from storage, the processor reconstructs the image based on the coding bitmap, the additional bitstream segments of encoded strips, and the previously fully compressed and strip-indexed key image. Further, because the Huffman labels are the same across all images, it is possible to inject parts of the Huffman streams for individual strips from previously compressed images.

3. Systems

Figure 2:
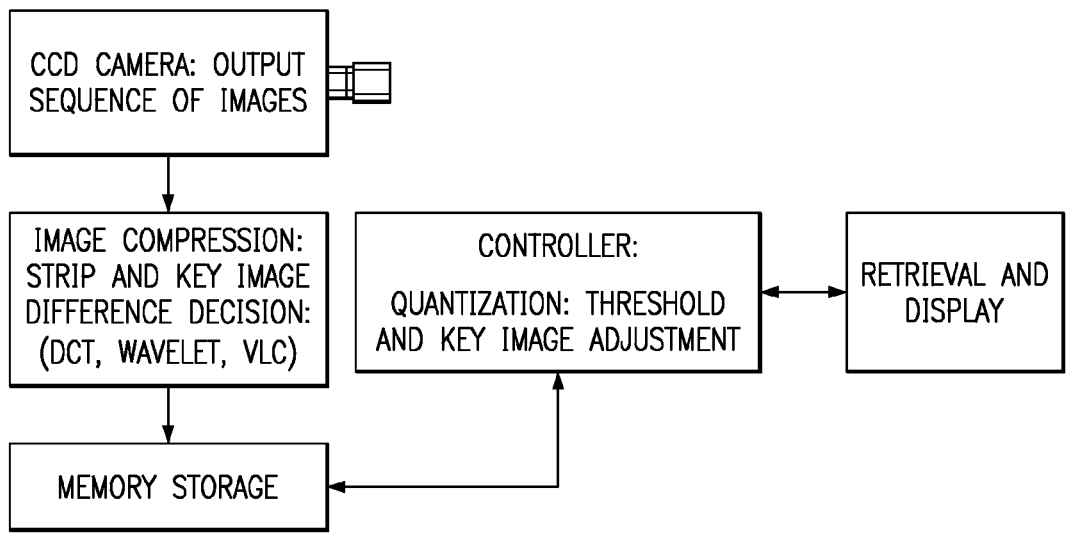
FIG. 2 shows a preferred embodiment camera system.
Figure 3:
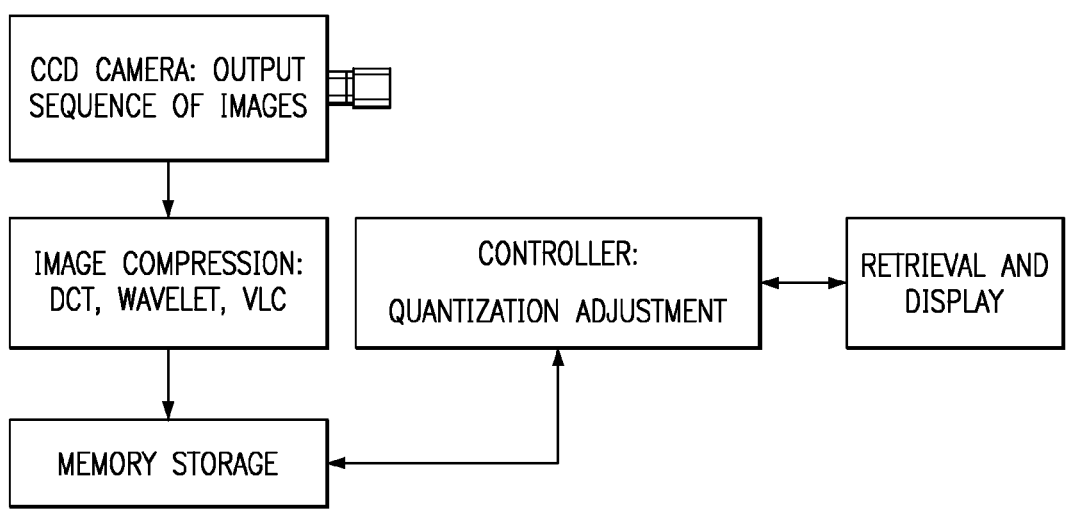
FIG. 3 shows a camera system.

The preferred embodiment methods are well suited for environments in which require continuous compression and storage of video or sequences of images which contain only partial spatial updates. FIG. 2 illustrates functional blocks of a preferred embodiment surveillance camera system which incorporates the preferred embodiment compression of the sequence of images captured by the CCD camera. Note that the memory/storage could be removable and the retrieval/display could be physically disconnected from the camera/compression with each subsystem including a controller. The methods are well suited for DSPs which can quickly perform DCTs but take a long time for variable length coders such as Huffman. The methods require significantly less time in coding and less storage media. The methods provide a mechanism to permit faster JPEG encoding, which is often a critical limitation on systems, in exchange for slightly slower image retrieval.

4. Modifications

The preferred embodiments can be varied while maintaining the features of analysis of DCT (e.g., DC coefficients) of blocks in a strip of an image to decide whether to encode as (quantized) DCT coefficients (plus possible variable length encoding) or as an approximation of an-already-encoded corresponding strip in a prior image.

For example, other partitions of an image into strips, such as multiple strip partitions with a few bits attached to the key frame to select which partitioning into strips is being used. Also other measures of error, such as sums of squares could be used in place of absolute values for the coding decision. More than just the DC coefficients could be used in the coding decision; for example, the DC coefficient plus the three lowest AC coefficients could all be differenced and thresholded. Analogously, initially only the DC coefficients could be computed and the decision as to whehter to encode or to repeat the prior strip could be made prior to any full DCT coefficient computation needed for the blocks of the strip. Further, wavelet and other transform methods could be used in place of DCT with analogous coefficient analysis for encoding decisions.

What is claimed is:

1. A method of image compression, comprising:
(a) comparing blocks of pixels in a strip of blocks in an input image to corresponding blocks of pixels in a corresponding strip of blocks of a prior image with said strip including an entire row of blocks;
(b) encoding said strip of blocks of an input image as said corresponding strip of blocks of a prior image when said comparing of step (a) indicates said strip approximates said corresponding strip.

2. The method of claim 1, wherein:
(a) said comparing of step (a) of claim 1 includes comparing to a threshold the difference between DC coefficients of each of the blocks of said strip and DC coefficients of each of the blocks of said corresponding strip.

3. The method of claim 1, further comprising:
(a) encoding said strip of blocks of an input image of step (a) of claim 1 by JPEG encoding when said comparing of step (a) indicates said strip fails to approximates said corresponding strip.

* * * * *